United States Patent
Schieke et al.

(10) Patent No.: US 9,889,513 B2
(45) Date of Patent: Feb. 13, 2018

(54) METHOD FOR DRESSING A HONING TOOL AND METHOD FOR HONING A TOOTHED WHEEL

(71) Applicant: Präwema Antriebstechnik GmbH, Eschwege/Werra (DE)

(72) Inventors: Jörg Schieke, Erfurt-Marbach (DE); Walter Holderbein, Eschwege (DE)

(73) Assignee: Präwema Antriebstechnik GmbH, Eschwege/Werra (DE)

( * ) Notice: Subject to any disclaimer, the term of this patent is extended or adjusted under 35 U.S.C. 154(b) by 0 days.

(21) Appl. No.: 15/518,909

(22) PCT Filed: Oct. 12, 2015

(86) PCT No.: PCT/EP2015/073539
§ 371 (c)(1),
(2) Date: Apr. 13, 2017

(87) PCT Pub. No.: WO2016/058979
PCT Pub. Date: Apr. 21, 2016

(65) Prior Publication Data
US 2017/0225249 A1    Aug. 10, 2017

(30) Foreign Application Priority Data
Oct. 16, 2014    (DE) .................. 10 2014 115 022

(51) Int. Cl.
| | |
|---|---|
| B24B 53/00 | (2006.01) |
| B23F 17/00 | (2006.01) |
| B23F 19/05 | (2006.01) |
| B23F 23/12 | (2006.01) |
| B24B 53/075 | (2006.01) |
| B24B 53/085 | (2006.01) |

(52) U.S. Cl.
CPC ............ *B23F 17/005* (2013.01); *B23F 19/05* (2013.01); *B23F 23/1231* (2013.01); *B24B 53/075* (2013.01); *B24B 53/085* (2013.01)

(58) Field of Classification Search
CPC .... B23F 17/005; B23F 19/05; B23F 23/1231; Y10T 409/20; Y10T 407/17–407/1745; Y10T 23/1225
USPC ............ 409/63; 407/20–29; 451/47, 56, 443
See application file for complete search history.

(56) References Cited

U.S. PATENT DOCUMENTS

| | | | | |
|---|---|---|---|---|
| 1,609,331 A | * | 12/1926 | Trbojevich | ................ B23F 5/20 125/11.03 |
| 3,147,535 A | * | 9/1964 | Wildhaber | ................ B23F 7/00 407/27 |
| 3,505,911 A | * | 4/1970 | Anthony | ................ B23F 21/28 407/27 |

(Continued)

FOREIGN PATENT DOCUMENTS

| | | |
|---|---|---|
| DE | 19501979 A1 | 7/1996 |
| DE | 19500801 A1 | 9/1996 |

(Continued)

*Primary Examiner* — George Nguyen
(74) *Attorney, Agent, or Firm* — The Webb Law Firm (57) ABSTRACT

A method for dressing a honing tool using a dressing tool which during the dressing operation rolls at an axial intersection angle with the honing tool. The teeth thereof which move into engagement with the teeth of the dressing tool each have an upper face which is to be dressed and tooth flanks which are also to be dressed.

15 Claims, 8 Drawing Sheets

(56) References Cited

U.S. PATENT DOCUMENTS

| | | | | |
|---|---|---|---|---|
| 4,175,537 A | * | 11/1979 | Wiener | B23F 23/1225 125/11.03 |
| 5,289,815 A | * | 3/1994 | Krenzer | B24B 53/075 125/11.03 |
| 5,591,065 A | * | 1/1997 | Mizuno | B24B 53/075 451/180 |
| 6,164,880 A | | 12/2000 | Pulley et al. | |
| 6,497,610 B1 | * | 12/2002 | Reichert | B23F 23/1231 451/21 |
| 7,294,046 B2 | * | 11/2007 | Turich | B23F 23/1225 409/63 |
| 2014/0090503 A1 | | 4/2014 | Ohmi | |

FOREIGN PATENT DOCUMENTS

| | | | | |
|---|---|---|---|---|
| DE | 202006002878 U1 | 6/2006 | | |
| DE | 102007043384 A1 | * 3/2009 | ......... | B23F 23/1225 |
| DE | 102012108717 A1 | 3/2014 | | |
| JP | 2006212726 A | 8/2006 | | |
| JP | 2006224240 A | 8/2006 | | |

\* cited by examiner

METHOD FOR DRESSING A HONING TOOL AND METHOD FOR HONING A TOOTHED WHEEL

CROSS-REFERENCE TO RELATED APPLICATIONS

This application is the United States national phase of International Application No. PCT/EP2015/073539 filed Oct. 12, 2015, and claims priority to German Patent Application No. 10 2014 115 022.8 filed Oct. 16, 2014, the disclosures of which are hereby incorporated in their entirety by reference.

BACKGROUND OF THE INVENTION

Field of the Invention

The invention relates to a method for dressing a honing tool which is intended for the fine machining of the teeth of a toothed wheel. For the dressing processing operation, there is used a dressing wheel which, during the dressing operation with the honing tool which is intended to be dressed, continuously rolls at an axial intersection angle so that teeth which are formed on the dressing wheel move into engagement with teeth which are formed on the honing tool and which each have an upper face which is intended to be dressed and tooth flanks which are also intended to be dressed.

Description of Related Art

The honing of toothings or toothed wheels is a fine machining method involving cutting using a geometrically non-defined blade in order to process toothed wheels. In this instance, hardened toothed wheels are generally honed using a honing tool which is also referred to as a honing wheel, honing ring or honing stone. The honing tool comprises, for example, a synthetic resin or ceramic bond in which hard material grinding grains of white corundum, sintered corundum or boron nitride are embedded.

As a result of the continuously operating toothed wheel honing method, it is possible above all to correct short-wave toothing deviations. These may lead to noises which are very unpleasant for the human ear. As a result of their high-frequency nature, they may further have a negative effect on the service-life of the respective component.

During the honing processing operation which is carried out continuously, the toothed-wheel-like honing tool and the toothed wheel which is intended to be processed roll on each other in a synchronous rotation. The toothing of the honing tool and toothed wheel mesh in this instance at an axial intersection angle which is adjusted between the skewed rotation axes of the honing tool and toothed wheel.

As a result of the rolling rotation and the axial intersection angle, there is between the tooth flanks of the honing tool and the tooth flanks of the toothed wheel which is intended to be processed during rolling contact a sliding relative movement which brings about the chip removal on the toothed wheel. The sliding movement of the honing tool in contact with a tooth flank of the toothed wheel is composed of a radial movement which is produced by the rolling rotation and an axial movement which is produced by the axial intersection angle. The axial and radial components of the sliding movement result in the processing marks which are characteristic of toothed wheel honing and which can be seen as "herringbone patterns" on the tooth flanks of the toothed wheel which has been completely processed.

As a result of the toothed wheel honing operation, it is particularly possible to positively influence the noise behaviour and the load-bearing capacity of a toothing as a result of the correction of short-wave toothing deviations and the introduction of residual compressive stresses in the region of the toothed wheel edge zone.

The honing tool is dressed before the first use in the new state and after a specific period of use. The dressing operation serves to correct production-related or wear-related shape deviations of the honing tool from the optimum desired shaping in each case and thus to sharpen the respective tool with respect to the geometry thereof.

In particular with internally toothed honing tools, so-called honing rings, the dressing is generally carried out in two steps. In a first step, the outside or internal diameter of the honing ring is dressed using a generally cylindrical dressing roller. In a second step, the tooth flanks of the honing ring are then dressed using a toothed dressing wheel.

The result of this operating method is that the dressed upper surfaces and a respective dressed tooth flank of a tooth of the honing ring converge in the region of the tooth tip in a sharp-edged upper corner. The path described by this upper corner during the honing operation changes over the useful length of the honing tool. In the new state, as a result of the sharp-edged upper corner on the toothed wheel workpiece in the tooth base region, there is produced a sharp notch which reduces the tooth base load-bearing capacity or tooth base strength of the toothing of the toothed wheel. This effect decreases as the useful length of the honing tool decreases, that is to say, as the wear or repeated dressing operations increase. As a result of wear and repeated dressing, with honing tools which are constructed, for example, as a honing ring, the radius of the base rounding which is produced is increased.

For the honing processing of toothed wheels for which fine machining of the tooth base region is also required, there is therefore artificially produced a state of the honing tool which would be produced during use only after a specific period of use or after a specific number of dressing operations. The effective period of time for which the honing tool can be used is thereby significantly shortened compared with the useful period for which the honing tool would actually be able to be used starting from the new state. The artificial shortening of the service-life naturally leads to increased tool costs.

Modern gear mechanism constructions increasingly demand, that during the honing processing operation of toothed wheels, the tooth base region is also honed in order to also achieve optimum load-bearing capacities in the tooth base region by means of optimisation of the surface state. In this instance, it is desirable to prevent steps in the surface nature or the geometry in the region of the transition between the respective tooth flank and the adjacent tooth base region.

SUMMARY OF THE INVENTION

Against this background, an object of the invention was, on the one hand, to provide a method which enables a honing tool to be constructed in such a manner that it can also carry out in the tooth base region a honing processing operation by means of which neither the geometry nor the load-bearing capacity of the respective tooth are influenced in a negative manner. On the other hand, there is intended to be provided a method by means of which it is possible to fine-machine toothed wheels in such a manner that in the tooth base regions thereof optimum surface properties with respect to the load-bearing capacity are also ensured.

With regard to the method for constructing a honing tool, the invention has achieved this object in that when dressing a honing tool the operating steps set out in Claim 1 are carried out.

With regard to the method for fine-machining toothed wheels, the solution to the above-mentioned problem proposed by the invention involves the honing method set out in Claim 14.

Advantageous embodiments of the invention are set out in the dependent claims and are explained in detail below in the same manner as the general notion of the invention.

The invention is based on the notion, when dressing a honing tool which is intended for the fine machining of the teeth of a toothed wheel, of dressing the tip and the flanks of the teeth of the honing tool together using a dressing tool. The dressing tool which is used for this purpose has according to the invention a defined base geometry which is adapted to the toothed wheel workpiece which is intended to be honed using the honing tool. The tip form of the teeth of the honing tool thereby changes over the useful length of the honing tool but is no longer sharp-edged. Consequently, it is possible to keep the geometry which is modeled on the respective toothed wheel workpiece substantially constant over the entire useful length of the honing tool. The notch effect on the transition from the tooth flanks to the tooth base region which is located in each case therebetween is thereby minimised. It is consequently not necessary to artificially produce a state of use of the honing tool as exists only after a longer period of use during normal use.

Therefore, in the method according to the invention for dressing a honing tool which is intended for the fine machining of the teeth of a toothed wheel in accordance with the prior art explained in the introduction, there is used a dressing tool which during the dressing operation rolls continuously with the honing tool which is intended to be dressed at an axial intersection angle so that teeth which are formed on the dressing wheel move into engagement with teeth which are formed on the honing tool and which have upper faces which are intended to be dressed and tooth flanks which are also intended to be dressed.

According to the invention, in at least one positioning of the dressing wheel, both the upper faces and the tooth flanks of the honing tool are processed in this case. At the same time, according to the invention, using tooth base rounded portions which are provided on the teeth of the dressing wheel, step-free transitions from the tooth flanks to the upper faces of the honing tool are modeled.

In a corresponding manner, the method according to the invention for honing a toothed wheel using a honing tool which, during the honing operation, continuously rolls at an axial intersection angle with the toothed wheel which is intended to be honed so that the teeth of the honing tool move into engagement with the teeth of the toothed wheel, makes provision for the honing tool using the dressing method according to the invention to be dressed in such a manner that step-free transitions are formed between the upper faces and the tooth flanks of the honing tool and, in at least one positioning of the honing tool, both the upper faces and the tooth flanks of the honing tool process the toothing which is intended to be honed and, with the tooth flanks and the upper faces of the honing tool, tooth base rounded portions are modeled on the teeth of the toothed wheel.

In the dressing operation of a honing tool according to the invention, both the upper faces and the tooth flanks of the honing tool are consequently processed in at least one positioning of the dressing tool in one step. In this instance, the dressing tool, and the honing tool mesh in a synchronous rotational movement, wherein the dressing tool is positioned until the required desired geometry of the honing tool has been formed.

In contrast to previously known dressing methods, with the method according to the invention it is consequently no longer necessary to provide two separate dressing tools for dressing the upper faces and tooth flanks of the honing tool which dress the honing tool in two separate operating steps. Instead, the profiling of the honing tool is carried out according to the invention using a honing tool in a single operating step. On the one hand, the tool costs and, on the other hand, the dressing times are thus reduced.

The dressing tool used according to the invention is typically a toothed-wheel-like dressing wheel.

The honing tool is typically an internally toothed honing ring or an externally toothed honing wheel. An internally toothed honing ring is particularly suitable for industrial large-batch hard/fine machining of externally toothed cylindrical gears or spur gears. In comparison with externally toothed tools, the internally toothed honing ring has a higher coverage in rolling engagement with the toothing which is intended to be produced so that the tool wear is generally reduced and the tool service-life is increased. However, if a sufficiently rigid machine tool is available for dressing, it may also be advantageous to use a wheel-like dressing tool which is provided with an external toothing in the manner of a toothed wheel.

The method according to the invention may be used in a particularly efficient manner to dress obliquely toothed honing tools, wherein the dressing wheel may then also be toothed in an oblique manner. However, straight toothed dressing wheels are also possible.

A "positioning" of the dressing tool with respect to the honing tool or the honing tool relative to a toothed wheel which is intended to be honed means in this instance that as a result of the change of the relative position which is brought about by the positioning, the teeth which mesh in each case are pressed against each other during the rolling engagement so that a grinding material or chip removal between the tool which is processed in each case and the workpiece which is processed in each case is carried out. During the dressing operation, in a "positioning operation" there is consequently produced a grinding grain removal on the honing tool between the dressing wheel and the honing tool. In the same manner, as a result of the positioning in the honing processing operation there is produced a material removal on the toothed wheel brought about by the contact with the honing tool.

To this end, in a manner known per se during the dressing operation according to the invention the dressing wheel and the honing tool or, during the honing processing operation according to the invention, the honing tool and the toothed wheel can be driven in a machine tool with a separate drive about a rotation axis, respectively. In addition, in a manner also known per se, actuating drives may be provided in order to adjust the relative position of the dressing wheel and honing tool or honing tool and toothed wheel along the rotation axis of the dressing wheel or toothed wheel and a direction transversely relative thereto. The positioning of the dressing wheel relative to the honing tool may, for example, be carried out by means of an advance movement along the connection line which defines the axial spacing and which is perpendicular to the two rotation axes. In addition, a chip or grinding grain removal may be brought about by the introduction of an angle offset within the coupled rotation movement of the axial drives so that the tooth flanks are tensioned against each other by means of the rotating drives.

In order to enable optimised shaping of the upper faces and tooth flanks of the honing tool with respect to the desired processing result, on the one hand, and of the tooth flanks and the tooth base region of the toothed wheel which is intended to be honed, on the other hand, there are provided on the teeth of the dressing tool which is used according to the invention tooth base rounded portions by means of which step-free transitions from the tooth flanks to the upper faces are formed on the honing tool which is intended to be dressed.

The term "step-free" in this context means that the respective tooth flank face in the dressing operation according to the invention of the honing tool which is obtained merges in a continuous, curved path into the upper face of the respective tooth and with the toothed wheel which is shaped according to the invention merges in a curved path which is also free from interruptions into the tooth base region of the respective toothed wheel tooth. In the region of the respective transitions, therefore, there is no notch or edge which is modeled by the dressing wheel in the region of the transition between the upper face and the tooth flank on the honing tool.

In the operating method according to the invention there are consequently produced between the tooth flanks and the upper faces of the honing tool by the dressing wheel in particular transitions which describe in one cut a continuously curved curve progression transversely relative to the rotation axis of the dressing wheel. When the honing tool is dressed, the tooth of the dressing wheel which is associated therewith in each case consequently slides in at least one positioning operation between engaging the tooth and leaving the tooth in a continuous movement over the upper face and tooth flank of the tooth of the honing tool. The dressing of the upper faces and tooth flanks of the honing tool is thus carried out in a continuous movement in one operating step.

The dressing of the honing tool according to the invention may be carried out in a manner known per se in a conventional honing machine which is used for honing toothed wheels or the like. To this end, the dressing tool which is constructed according to the invention can be tensioned on the workpiece spindle of the honing machine in place of the workpiece which is provided in each case with a toothing. Conventional honing machines generally have an adequate number of movement and adjustment axes (rotation axis B=tool spindle, rotation axis C=workpiece spindle, adjustment axis X=movement axis of the transverse tool sliding member orientated transversely relative to the workpiece spindle C, adjustment axis Z=movement axis of the longitudinal tool sliding member orientated transversely relative to the movement axis B, axial intersection angle W, optionally adjustment axis Y=adjustment axis which is orientated vertically with respect to the adjustment axes X, Y for a relative movement between the workpiece and tool), in order, on the one hand, to carry out the necessary relative movements during the processing operation and, on the other hand, to carry out the adjustment of the positions in which the dressing tool and the honing tool which is intended to be dressed have to be arranged relative to each other during the dressing processing operation and, during the honing processing operation, the honing tool and the toothed wheel which is intended to be processed have to be arranged relative to each other.

Depending on the movement axes available in the machine tool which is available in each case, it may be advantageous for at least the geometry of the tooth base rounded portions of the teeth of the dressing tool to correspond to a desired geometry of the teeth of the toothed wheel which is intended to be processed with the honing tool in each case in the completely processed state. In this manner, the honing tool is formed during the dressing operation in such a manner that it models the desired shape of the transition between the tooth flanks and the tooth base region on the toothed wheel which is intended to be honed without the dressing or honing processing operation having to follow specific kinematics for this purpose. This operating method can be implemented in practice in a particularly effective manner when the entire geometry of the teeth of the dressing tool corresponds to the desired geometry of the teeth of the toothed wheel which is intended to be processed using the honing tool in the completely processed state.

If, however, there is provided a machine tool or dressing machine which has an adequate number of movement and adjustment axes to carry out the movements required to model tooth modifications on the toothed wheel during the dressing or honing processing operation, according to an alternative embodiment the desired geometry of the teeth of the honing tool can be produced by means of an adjustment of the relative position of the dressing tool and honing tool which is intended to be dressed, which adjustment is carried out during the dressing processing operation. The adjustment of the relative position then enables toothing modifications which are intended to be modeled on the toothed wheel which is intended to be processed by the honing tool to be introduced into the teeth of the honing tool.

An embodiment of the invention which is particularly advantageous with regard to the variability of the method parameters and the resultant wide variety of possibilities for introducing toothing modifications involves the width of the teeth of the dressing tool being much smaller than the width of the teeth of the honing tool so that the dressing tool has to be moved to pass over the width of the teeth of the honing tool which is intended to be dressed by a length in the longitudinal direction of a tooth gap which is provided between two teeth of the honing tool and which corresponds to a multiple of the width of the teeth of the dressing tool. A corresponding dressing tool is described in EP 2 036 672 B1, the content of which is incorporated in the disclosure of the present application by reference.

As a result of the intensive contact between the dressing wheel and tool which is intended to be dressed as achieved with such a narrow dressing tool, an effective chip discharge and consequently a particularly clean surface is achieved on the toothed wheels which are processed in each case. The small width of the dressing wheel therefore enables the size of the surfaces thereof which move into contact with the tool which is intended to be dressed to be minimised even when dressing tools with oblique toothing or toothing which are shaped in any other complex manner. This applies accordingly, for example, when a tool which is intended for the processing of a workpiece with linear teeth is dressed using a narrow dressing wheel according to the invention. In this manner, the dressing wheel according to the invention can be moved during the dressing operation in a substantially freely controllable movement along the tooth flanks of the tool which is intended to be dressed regardless of the shape of the teeth which are intended to be processed in each case when the dressing wheel and tool which is intended to be dressed are in engagement.

If a narrow dressing wheel of the type explained above is used for the dressing method according to the invention, the width of the surfaces thereof which come into contact with the honing tool which is intended to be dressed in each case is optimally reduced to such an extent that the narrow sides thereof associated with the tooth flanks of the tool which is intended to be dressed are constructed in the manner of a knife blade or, if this is not possible for technical reasons relating to materials, are at least so narrow that in each case only a minimal overlapping face is provided between the narrow sides of the dressing wheel and the flank faces of the tool which is intended to be processed.

Accordingly, another embodiment of the invention makes provision for the width of the teeth of the dressing wheel which move into engagement with the tool which is intended to be dressed to correspond to a maximum of a fifth, preferably a maximum of an eighth, of the width of the teeth of the tool which is intended to be dressed.

Depending on the axial intersection angle required and the over-measurement of the generally simply roughly pre-toothed honing tools provided in the new state, in particular with internally toothed honing tools there is the risk that, during the honing operation between the teeth of the dressing tool and the teeth of the honing tool which is intended to be dressed, in addition to the tooth contact which is intended for the desired material removal, undesirable collisions may occur between the dressing wheel and honing tool at another location of the tooth gap. By a dressing tool being used whose teeth which come into contact with the honing tool which is intended to be dressed are, in the manner described above, narrower than the teeth of the honing tool so that a relative movement in the longitudinal direction of the respective tooth gap between two teeth of the honing tool is required in order to cover the tooth faces and the tooth base region of the honing tool completely with the dressing tool, this problem can be reliably avoided.

Such a narrow dressing wheel, as a result of its reduced tooth width, takes up only minimal space when viewed in the longitudinal direction of the gap between two teeth of the honing ring. Consequently, there is also not then produced any collision between the dressing tool and honing tool when the respective tooth of the dressing tool, as a result of the respectively adjusted axial intersection angle with respect to the tooth which is in rolling contact therewith in each case for the dressing processing operation, is orientated in an oblique manner and is accordingly located in an oblique manner in the tooth gap of the honing tool, which gap is delimited by the respective tooth. It is thus possible using a narrow dressing tool of the type which is described above and which has the tooth base rounded portions provided according to the invention to model in a simple and operationally reliable manner an optimally rounded transition between the upper face and the flanks of the teeth of a honing tool.

In this instance, as already mentioned, the possibilities of introducing toothing modifications, such as, for example, corrections of the profile or flank line, during the dressing operation by adapting the process kinematics in the toothing of the honing tool are greater the smaller the width of the teeth of the dressing tool is in comparison with the width of the teeth of the honing tool which is intended to be dressed.

The axial intersection angle both with the dressing operation according to the invention and with the honing operation according to the invention may be between 3 and 25°. In this instance, axial intersection angles from 3 to 20° have been found to be practical.

The lower the axial intersection angle selected, the lower the relative cutting speeds are between the dressing wheel and honing tool, or the honing tool and a toothed wheel which is intended to be honed, at the same rotational speed. It has been found to be advantageous in this instance, at least with the honing operation according to the invention, but also optionally with the dressing operation according to the invention, for low cutting speeds from 0.5 to 10 m/s to be adjusted in comparison with toothing grinding. As a result of the low cutting speeds, it is possible to avoid thermal damage (grinding burn) of the processed toothed wheels in particular during the honing operation.

In principle, the dressing of the honing tool may be carried out with single-flank contact. In this instance, only one flank of a respective tooth of the dressing wheel is in contact with an associated flank of a tooth of the honing tool. However, it is also possible to carry out the dressing in such a manner that in each case at least two mutually facing tooth flanks of two teeth of the honing tool which are arranged adjacent to each other are in rolling contact with a tooth of the dressing wheel at the same time in at least one rolling position. The dressing of the honing tool is then carried out in a so-called "dual flank processing operation". In this instance, the positioning between the dressing tool and the honing tool can be carried out by changing the axial spacing between the dressing tool and honing tool. For example, between an externally toothed dressing tool and an internally toothed honing tool, the axial spacing is increased in order to produce the tension between the meshing tooth flanks of the dressing tool and honing tool as required for the chip removal.

BRIEF DESCRIPTION OF THE DRAWINGS

The invention is explained in greater detail below with reference to drawings which illustrate an embodiment. In the schematic drawings.

DETAILED DESCRIPTION

The teeth 1, 2 (shown in FIG. 7) of a honing tool 3 which has been dressed in conventional manner and which is constructed in the manner of an internally toothed honing ring have tooth flanks 4, 5 which face each other and an upper face 6 which extends between the tooth flanks 4, 5. The teeth 1, 2 of the honing tool 3 which are adjacent to each other together delimit a tooth gap 7 at the base of which the respective tooth flanks 4, 5 of the teeth 1, 2 merge in a tooth base region 8.

Figure 7:
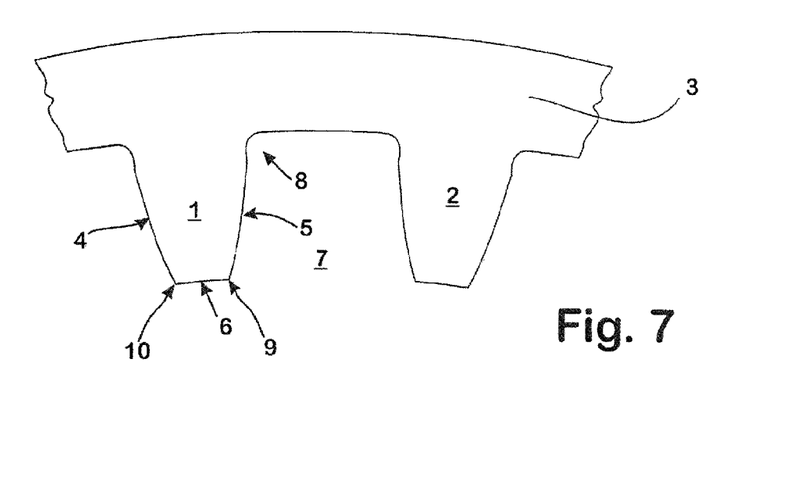
FIG. 7 is a side view of a cut-out of a honing tool which has been dressed in accordance with the prior art.

The tooth flanks 4, 5 have, in the conventional honing tool 3 illustrated in FIG. 7, been dressed in conventional manner using an externally-toothed wheel-like dressing tool which is not shown in this instance.

In a separate operating step, the upper faces 6 of the teeth 1, 2 have been dressed. In this instance, using a tool which is also conventional and which is not shown in this instance, material which is present on the upper faces 6 has been removed in a uniform manner.

As a result of this conventional dressing processing operation, at the transition of the upper face 6 to the tooth flanks 4, 5 an upper corner 9, 10 which has been formed with sharp edges has been produced.

Figures 8, 9:
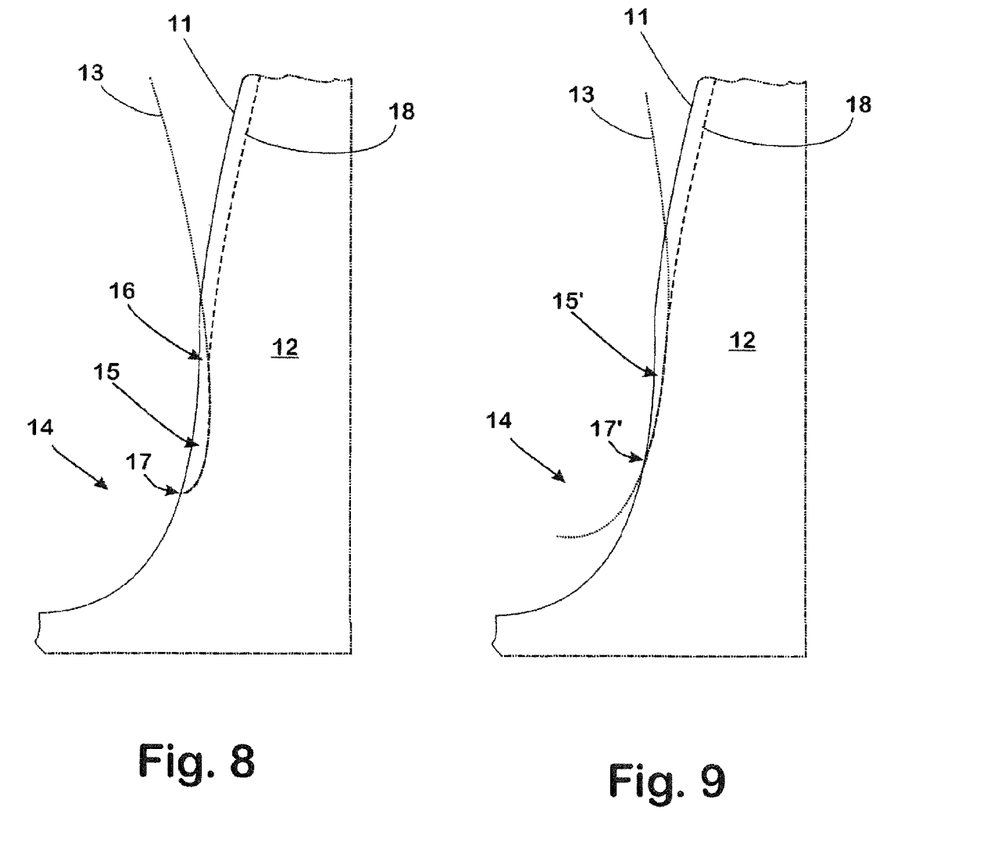
FIG. 8 is a cut-out of a profile line of a toothed wheel which has been honed in accordance with the prior art using a honing tool which has been dressed in conventional manner in the new state.
FIG. 9 is a cut-out of a profile line of a toothed wheel which has been honed in accordance with the prior art using a honing tool which has been dressed in conventional manner in the end state.

FIGS. 8 and 9 explain the result of a honing processing operation of the tooth flanks of an externally toothed toothed wheel, which operation has been carried out using the conventionally dressed honing tool 3.

In FIG. 8, to this end, the profile line 11 of a tooth 12 of the toothed wheel is illustrated in normal section prior to the honing processing operation as a solid line.

The trajectory 13 illustrated with dotted lines in FIG. 8 describes the path which, in a corresponding operating method, for example, the upper corner 9 of the honing tool 3 travels relative to the tooth 12 when the respective tooth 1, 2 of the honing tool 3 rolls on the tooth 12 of the toothed wheel which is intended to be honed during the honing processing operation.

It can be seen that the upper edge 9 in the tooth base region 14 of the tooth 12 forms a groove-like inwardly curved notch 15.

The notch 15 which in the case of linear toothing extends in the longitudinal direction of the respective tooth gap 7 orientated parallel with the rotation axis of the respective toothed wheel or, in the case of oblique toothing, along the pitch helix is, at the locations at which the upper corner 9 is introduced into the material of the tooth 12 or leaves it again, delimited by an edge 16, 17 in each case. In particular the edge 17 at which the upper corner 9 emerges again from the material of the tooth 12 is in this instance constructed with sharp edges.

After the honing operation, the tooth 12 therefore has in the tooth base region 14 thereof a profile line 18 which is illustrated with broken lines in FIG. 8 and whose path is characterised by a concavity which is brought about by the notch 15. The notch 15 leads to a weakening of the tooth 12 in the tooth base region 14 thereof. Furthermore using the conventional processing method, the tooth base region 14 is only partially detected by the teeth 1, 2 of the honing tool 3. A complete honing processing operation of the tooth base region 14 is consequently omitted.

The effects of the upper corner 9 which is provided on the honing tool are reduced as the period of use of the honing tool 3 continues. As shown in FIG. 9, however, they are in principle maintained. As a result of the material removal on the upper face 6 of the respective tooth 1, 2, which is associated with the dressing of the honing tool 3, the upper corners 9, 10 are displaced with each dressing operation in the direction of the outer periphery of the honing tool 3. As a result, the upper corner 9, after repeated dressing of the honing ring 3, is no longer introduced to such a great extent into the tooth base region 14 as with the new honing ring 3 (see FIG. 8). Nonetheless, there is also produced in this instance a notch 15' which, although not as deep, in particular at the portion of the tooth base region 14 which is not detected by the conventional honing processing operation, is delimited as before by a sharp edge 17'.

Figure 1:
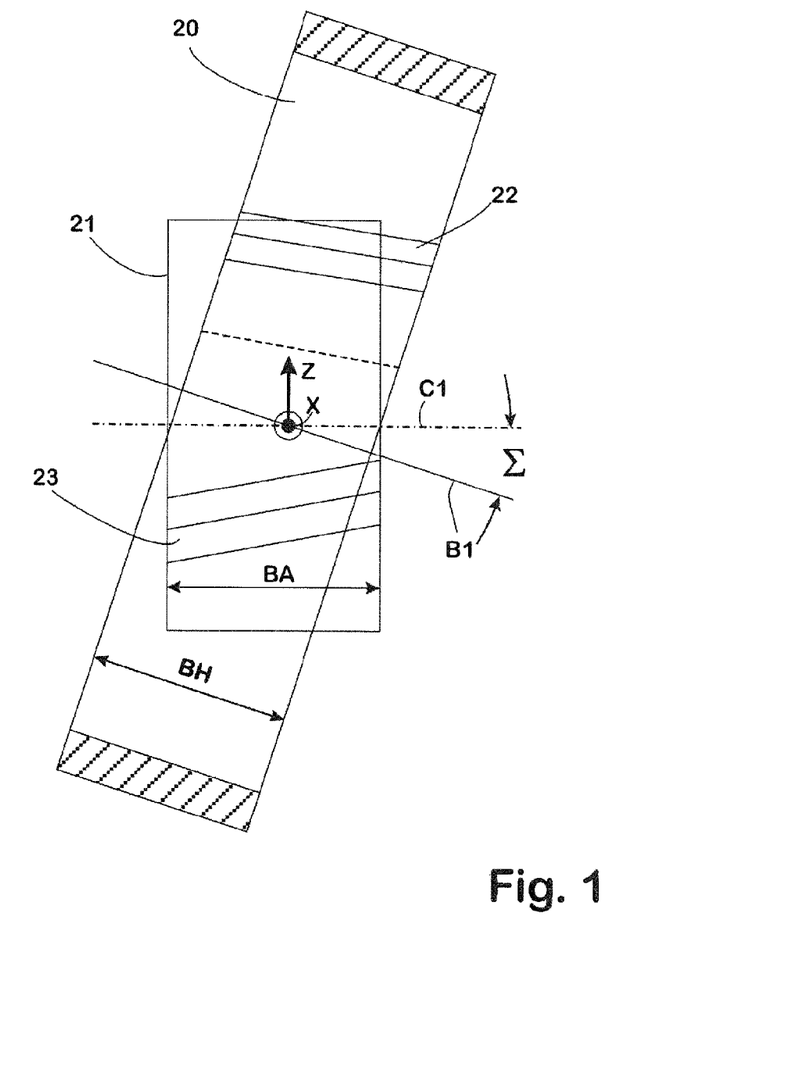
FIG. 1 is a partially sectioned view of a dressing tool and a honing tool in rolling engagement during the dressing processing operation.

FIG. 1 schematically shows a honing tool 20 which is also constructed as an internally toothed honing ring during the dressing operation using a dressing tool 21 which is shaped according to the invention and which is constructed in the manner of an externally toothed toothed wheel. The honing tool 20 and the dressing tool 21 are in this instance toothed in an oblique manner. However, the dressing processing operation can be carried out in the same manner with a linear toothing.

The width BH of the teeth 22 of the honing tool 20 measured parallel with the rotation axis of the honing tool 20 corresponds to at least the width BA of the teeth 23 of the dressing tool 21 measured parallel with the rotation axis of the dressing tool 21.

The honing tool 20 is driven about a rotation axis B1. The dressing tool 21 rotates synchronously therewith about a rotation axis C1. The rotation axis B1 and the rotation axis C1 are to this end skewed in space and orientated so as to be pivoted about an axial intersection angle Σ with respect to each other. The honing tool 20 and the dressing tool 21 are in this instance positioned relative to each other in such a manner that the teeth 22 of the honing tool 20 and the teeth 23 of the dressing wheel 21 roll continuously on each other. As a result of the rolling movement, the teeth 22 of the honing tool 20 are profiled by the teeth 23 of the dressing tool 23.

Figure 2:
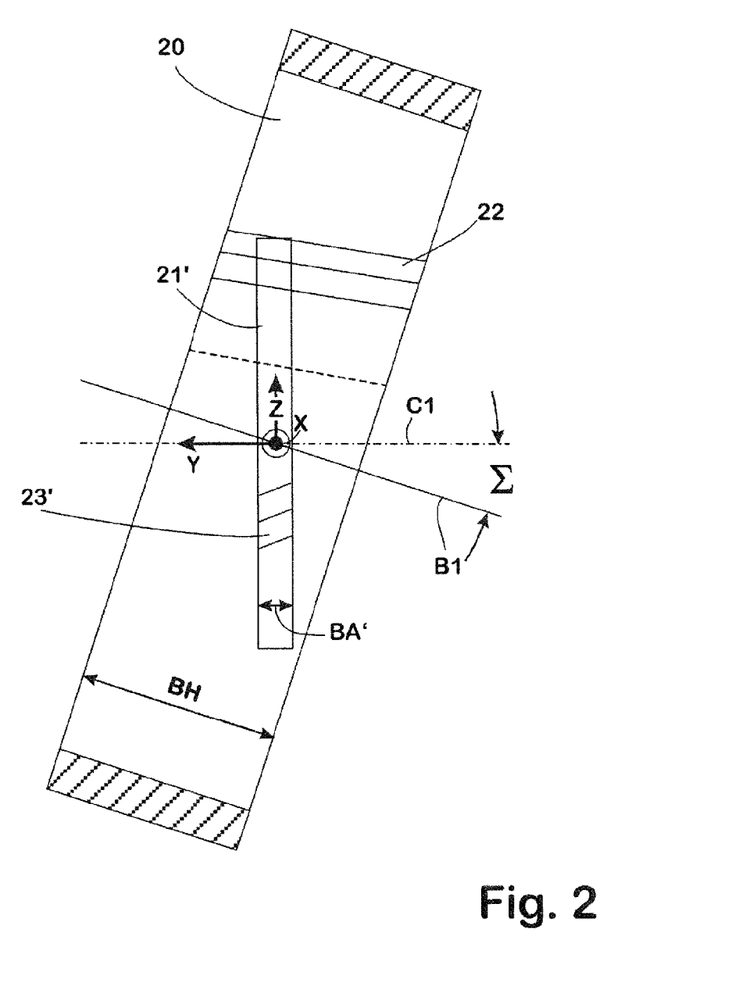
FIG. 2 is a partially sectioned view of another dressing tool and a honing tool in rolling engagement during the dressing processing operation.
Figure 3A:
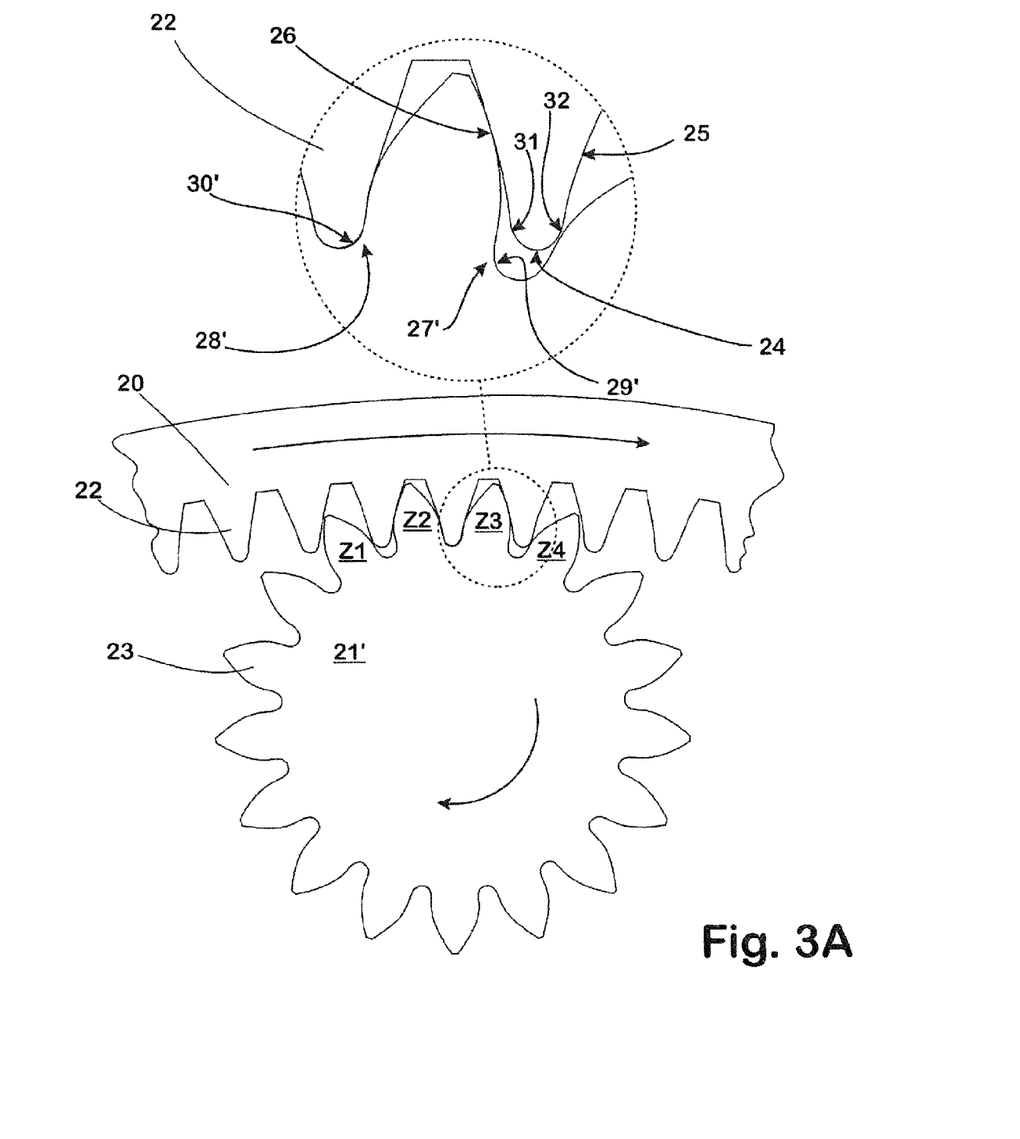
FIGS. 3A-3I are each an enlarged side view of a cut-out of the dressing tool and the honing tool in rolling engagement during different stages of the dressing processing operation, respectively.
Figure 3B:
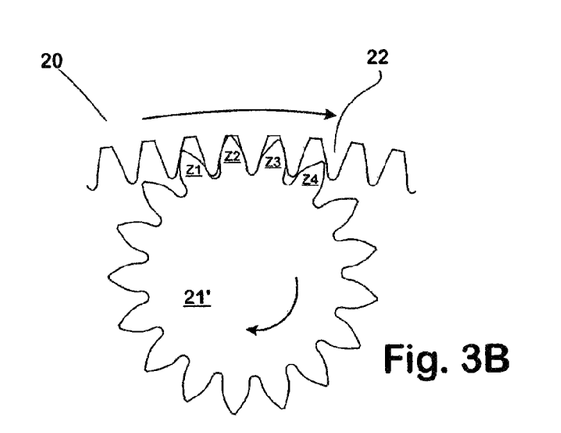
Figure 3C:
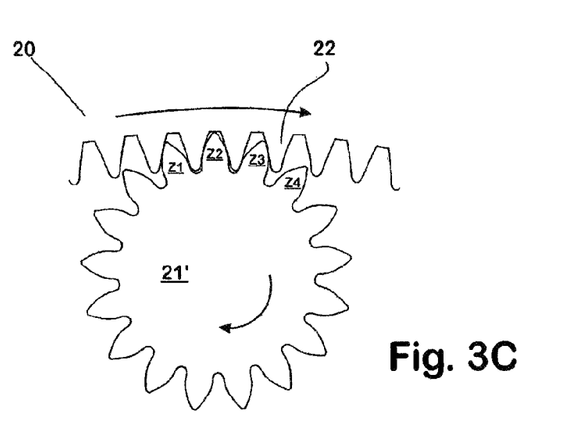
Figure 3D:
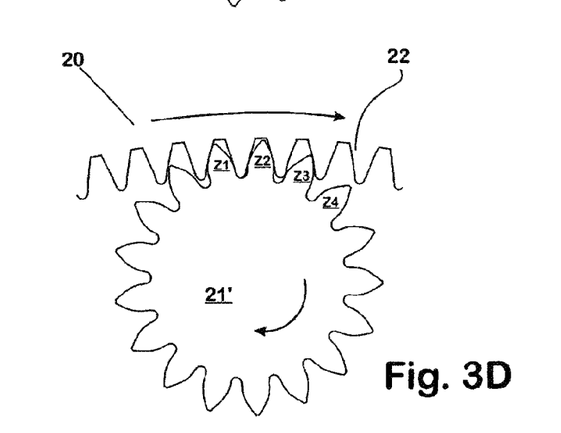
Figure 3E:
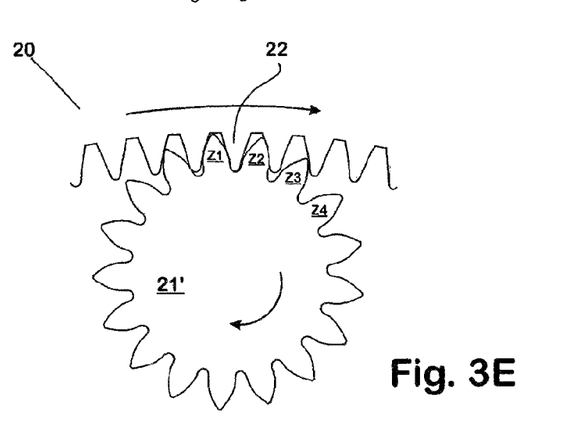
Figure 3F:
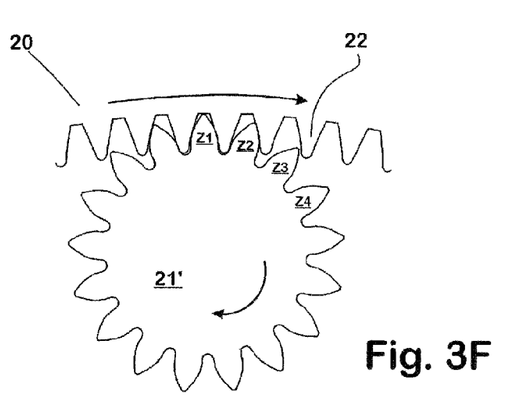
Figure 3G:
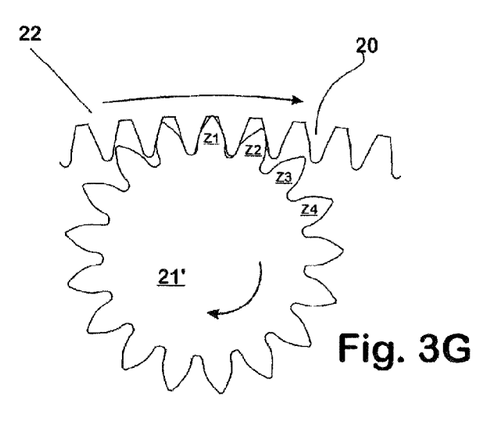
Figure 3H:
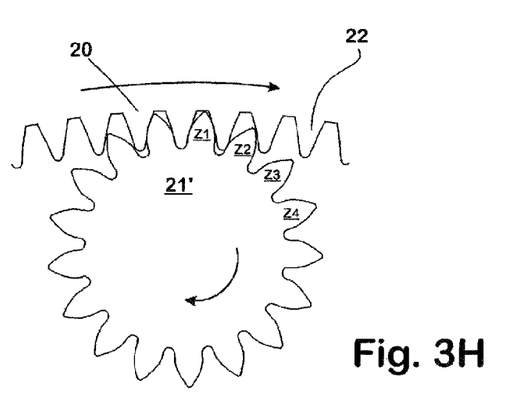
Figure 3I:
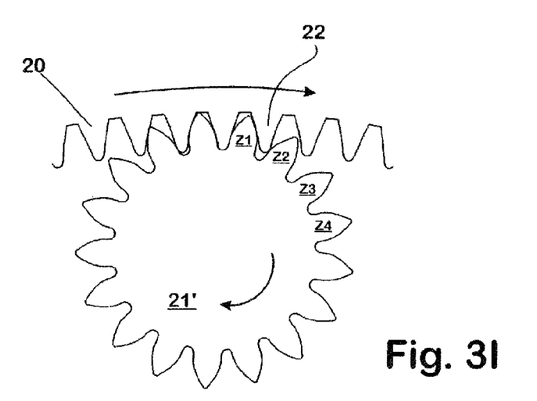

FIG. 2 shows as an alternative embodiment a dressing tool 21' together with a honing tool 20. The dressing tool 21' is also constructed in the manner of an externally toothed toothed wheel. However, the teeth 23' of the dressing tool 21' have a width BA' which is not illustrated to scale in FIG. 2 and which corresponds to a maximum of a fifth of the width BH of the teeth 22 of the honing tool 20, but which is preferably very much smaller, that is to say, for example, is only a tenth or a fifteenth of the width BH so that, when the dressing tool 21' rolls on the honing tool 20, there is optimally a substantially strip-like or line-like contact between the teeth 22 of the honing tool 20 and the teeth 23' of the dressing tool 21'.

In order in spite of the minimised width BA' thereof to be able to process the teeth 22 of the honing tool 20, during the dressing operation, the dressing tool 21 is additionally moved along an axis Y, which is orientated coaxially relative to the rotation axis C1, in the longitudinal direction through the respective tooth gap.

The advantage of using the narrow dressing tool 21' is that, compared with the wide dressing tool 20, as a result of the minimised width thereof, there is no risk with the dressing tool 21' of an unintentional collision being produced between the teeth 22 of the honing tool 20 and the teeth 23' of the dressing tool 21' when the teeth 23' of the dressing tool 21' roll on the teeth 22 of the honing tool 20. This affords greater levels of freedom with respect to the tooth shape which is intended to be modeled by the dressing tool 21' on the teeth of the honing tool 20 and which is transferred to the teeth of the toothed wheel which is intended to be honed in each case during the subsequent honing processing operation.

Furthermore, the kinematics during the dressing operation when the narrow dressing wheel 21' is used corresponds to the kinematics according to which the dressing is carried out when the dressing wheel 21 is used. Therefore, the following explanations are limited only to the dressing using the dressing wheel 21'.

The teeth 22 of the honing tool 20 which mesh with the teeth 23' of the dressing tool 21' during the dressing processing operation each have an upper face 24 and tooth flanks 25, 26 which are arranged opposite. In each of the rolling positions illustrated in FIGS. 3A to 3I, at least two teeth 23' of the dressing tool 21' are in engagement with a corresponding number of teeth 22 of the honing tool 20.

In order to explain the movement sequence, in FIGS. 3A-3I of the teeth 23' of the dressing wheel 21' four sequential teeth are designated Z1, Z2, Z3 and Z4, respectively.

The dressing tool 21' has in the respective tooth base region 27', 28' of the teeth 23' thereof tooth base rounded portions 29', 30' which form on the honing tool 20 the upper faces 24 and the respective transition 31, 32 in which the upper faces 24 merge into the respectively adjacent tooth flank 25, 26 of the teeth 22 thereof. The tooth base rounded portions 29', 30' are each constructed as continuous step-free curved lines so that also the transitions 31, 32 which are formed on the teeth 22 of the honing tool 21 are constructed in a step-free and continuously curved manner.

The dressing tool 21' acts in this regard in the manner of a master wheel in which the geometry of the teeth 23' corresponds to the desired geometry of the teeth of the toothed wheel which is intended to be honed with the honing tool 20 in each case.

During the dressing operation, the dressing tool 21' is positioned along the axis X in the direction of the honing tool 20 and is moved along the movement axis Y. With reference to the teeth 23' of the dressing tool 21', which teeth are designated Z1 to Z4 in FIGS. 3A to 3I, it is possible to follow step by step how the tooth base rounded portions 29', 30' of the dressing tool 21' are modeled in a continuous sequence on the upper faces 24 of the teeth 22 of the honing tool 21.

In order to fine-machine a pre-toothed toothed wheel using the honing tool 20 which is dressed according to the invention by means of honing, the toothed wheel which is intended to be honed is positioned in place of the dressing wheel 21 on the rotation axis C1 of the machine tool which is not illustrated in greater detail here. The kinematics during the honing operation corresponds in principle to the kinematics which can be seen in FIGS. 3A to 3I for the dressing method and which have been explained above. However, during the honing operation, in comparison with the dressing operation, higher rotational speeds of the toothed wheel which is intended to be honed and the honing tool 20 which runs in a synchronous manner are selected.

Figure 4:
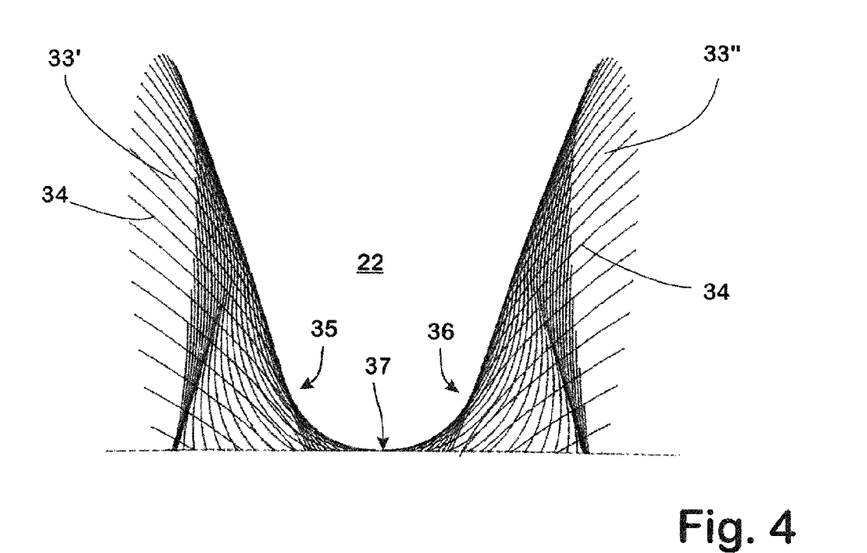
FIG. 4 is a cut-out of an upper tooth region of the honing tool in the new state.
Figure 5:
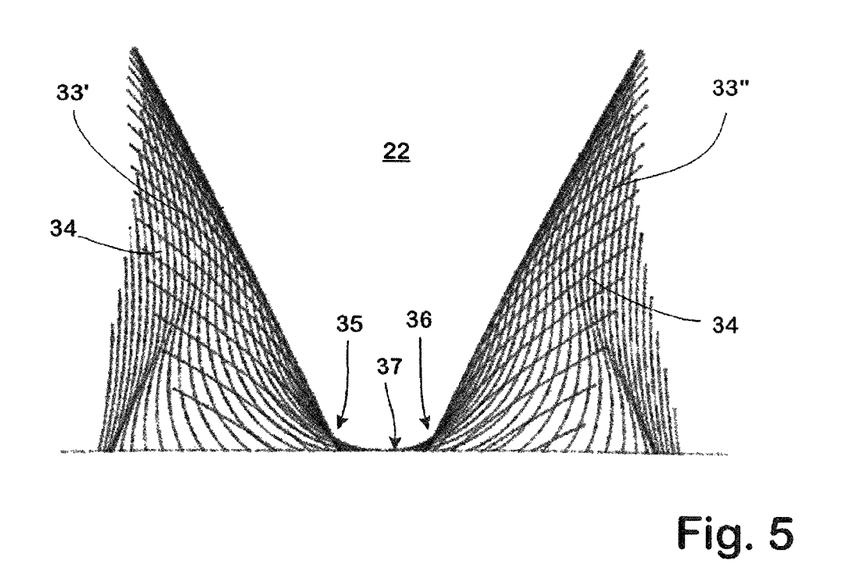
FIG. 5 is a cut-out of an upper tooth region of a honing wheel in the end state.
Figure 6:
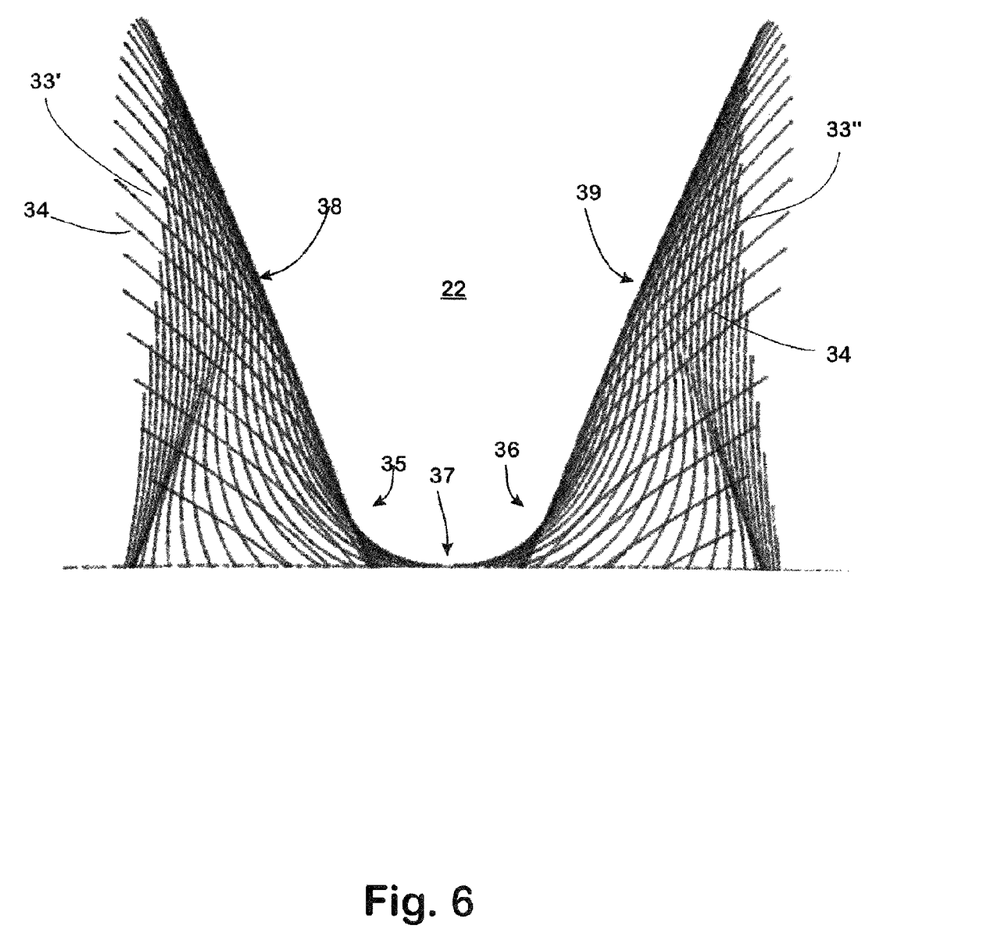
FIG. 6 is a cut-out of the upper tooth region of the honing tool in an intermediate state.

FIGS. 4 to 6 schematically show a tooth 22 of a honing tool 20 which has been dressed according to the invention in the new state (FIG. 4), in an end state (FIG. 5) after the last dressing operation which is still permitted within the permissible useful length and in a state which the tooth has between the two extreme states which are illustrated in FIGS. 4 and 5 (FIG. 6).

In this instance, there are illustrated in the manner of a wire model in FIGS. 4 to 6 by means of lines the marks 34 along which the teeth 23' of the dressing wheel 21' roll during the dressing processing operation with the tooth 22 of the honing tool 20. It can be seen that the dressing processing operation covers the entire tooth base region 35, 36 of the tooth 22 as well as the base 37 of the tooth gaps 33', 33" of the honing tool 20 which laterally adjoin the tooth 22 and that the transitions 35, 36 between the tooth flanks 38, 39 and the upper face 37 of the tooth 22 of the honing ring 20 are rounded in a continuous and step-free manner.

LIST OF REFERENCE NUMERALS 1, 2 Teeth of the honing tool 3
3 Honing tool
4, 5 Tooth flanks of the teeth 1, 2
6 Upper face of the teeth 1, 2
7 Tooth gap
8 Tooth base region
9, 10 Upper corners which are formed with sharp edges
11 Profile line
12 Tooth of a toothed wheel which is intended to be honed
13 Trajectory
14 Tooth base region of the tooth 12
15, 15' Notch
16, 17 Sharp edges
17' Sharp edge
18 Profile line
20 Honing tool
21 Dressing tool
21' Dressing tool
22 Teeth of the honing tool 20
23 Teeth of the dressing tool 21
23' Teeth of the dressing tool 21'
24 Upper face
25, 26 Tooth flanks
27', 28' Tooth base regions
29', 30' Tooth base rounded portions
31, 32 Transitions
33', 33" Tooth gaps
34 Marks
35, 36 Tooth base region of the teeth 22', 22"
37 Base of the tooth gap 33
38, 39 Tooth flanks of the teeth 22', 22"
BA Width of the teeth 23 of the dressing tool 21
BA' Width of the teeth 23'
BH Width of the teeth 22
B1 Rotation axis
C1 Rotation axis
Σ Axial intersection angle
X, Y, Z Movement axes, orientated orthogonally with respect to each other
Z1-Z4 Teeth of the dressing tool 21' (FIGS. 3A-3I)

The invention claimed is:

1. A method for dressing a honing tool for the fine machining of the teeth of a toothed wheel, comprising: applying a dressing tool such that, during a dressing operation with the honing tool to be dressed, the dressing tool continuously rolls at an axial intersection angle so that teeth which are formed on the dressing tool move into engagement with teeth which are formed on the honing tool, each of the teeth formed on honing tool having an upper face to be dressed and tooth flanks which are also to be dressed, wherein in at least one positioning of the dressing tool both the upper faces and the tooth flanks of the honing tool are processed, and wherein using tooth base rounded portions which are provided on the teeth of the dressing tool, step-free transitions from the tooth flanks to the upper faces are modelled on the honing tool.

2. The method according to claim 1, wherein the honing tool is an internally toothed honing ring.

3. The method according to claim 1, wherein the honing tool is an externally toothed cylinder wheel.

4. The method according to claim 1, wherein a geometry of the tooth base rounded portions of the teeth of the dressing tool corresponds to a desired geometry of the teeth of the toothed wheel which is to be processed with the honing tool in each case, in the completely processed state.

5. The method according to claim 4, wherein an entire geometry of the teeth of the dressing tool corresponds to the desired geometry of the teeth of the toothed wheel which is to be processed with the honing tool, in the completely processed state.

6. The method according to claim 4, wherein the desired geometry of the teeth of the honing tool is produced by an adjustment of the relative position of the dressing tool and honing tool which is to be dressed, which adjustment is carried out during the dressing processing operation.

7. The method according to claim 6, wherein as a result of the adjustment of the relative position, toothing modifications which are to be modelled on the toothed wheel which is to be processed by the honing tool are introduced into the teeth of the honing tool.

8. The method according to claim 1, wherein the dressing tool and the honing tool are toothed in an oblique manner.

9. The method according to claim 1, wherein the width of the teeth of the dressing tool is smaller than the width of the teeth of the honing tool to such an extent that the dressing tool has to be moved to pass over the width of the teeth of the honing tool which is to be dressed by a length in the longitudinal direction of a tooth gap which is formed between two teeth of the honing tool and which corresponds to a multiple of the width of the teeth of the dressing tool.

10. The method according to claim 9, wherein the width of the teeth of the dressing tool corresponds to a maximum of a fifth of the width of the teeth of the honing tool which is to be dressed.

11. The method according to claim 10, wherein the teeth of the dressing tool are constructed in the region of the faces thereof which come into contact with the honing tool in the manner of a knife blade.

12. The method according to claim 1, wherein the axial intersection angle is from 3° to 25°.

13. The method according to claim 1, wherein at least two mutually facing tooth flanks of two teeth of the honing tool which are arranged adjacent to each other are in contact with a tooth of the dressing tool at the same time in at least one rolling position.

14. A method for honing a toothed wheel, comprising: applying a honing tool such that, during a honing operation, the honing tool continuously rolls at an axial intersection angle with the toothed wheel to be honed so that teeth of the honing tool move into engagement with teeth of the toothed wheel, wherein the honing tool is dressed using the method according to claim 1, so that between the upper faces and the tooth flanks of the honing tool step-free transitions are formed, in that, in at least one positioning of the honing tool, both the upper faces and the tooth flanks of the honing tool process the toothing which is to be honed, and in that, with the tooth flanks and the upper faces of the honing tool, tooth base rounded portions are modelled on the teeth of the toothed wheel.

15. The method according to claim 14, wherein the tooth base regions formed between adjacent teeth of the toothed wheel are completely processed with the honing tool so that the tooth base regions of the toothed wheel provided between two teeth each have a continuously extending path which merges in a step-free manner into the adjacent tooth flanks of the adjacent teeth in each case.

\* \* \* \* \*

UNITED STATES PATENT AND TRADEMARK OFFICE
CERTIFICATE OF CORRECTION

PATENT NO. : 9,889,513 B2
APPLICATION NO. : 15/518909
DATED : February 13, 2018
INVENTOR(S) : Jörg Schieke et al.

It is certified that error appears in the above-identified patent and that said Letters Patent is hereby corrected as shown below:

In the Claims

Column 12, Line 54, Claim 1, delete "on" and insert -- on the --

Signed and Sealed this
Fifteenth Day of May, 2018

Andrei Iancu
*Director of the United States Patent and Trademark Office*